United States Patent [19]
Jellesma

[11] 3,880,761
[45] Apr. 29, 1975

[54] RECTANGULAR SIEVING FRAME AND FILTER DRUM PROVIDED WITH A PLURALITY OF SUCH SIEVING FRAMES

[75] Inventor: Anne Jellesma, Sneek, Netherlands

[73] Assignee: Machinefabriek W. Hubert & Co. B.V., Sneek, Netherlands

[22] Filed: Sept. 12, 1973

[21] Appl. No.: 396,508

[30] Foreign Application Priority Data
Sept. 18, 1972 Netherlands.................... 7212634

[52] U.S. Cl. ............................................. 210/404
[51] Int. Cl. ............................................ B01d 33/06
[58] Field of Search ...... 55/DIG. 31, 501, 511, 525; 210/400, 403, 402, 404, 155, 157, 161, 359

[56] References Cited
UNITED STATES PATENTS

| | | | |
|---|---|---|---|
| 1,496,517 | 6/1924 | Boehm | 210/359 X |
| 1,922,442 | 8/1933 | Knight | 210/155 |
| 2,076,104 | 4/1937 | Vinton | 210/359 X |
| 2,351,712 | 6/1944 | Sattels et al. | 210/402 X |
| 2,784,781 | 3/1957 | Rhoades | 55/DIG. 31 |
| 2,886,481 | 5/1959 | Swan | 55/DIG. 31 |
| 3,747,770 | 7/1973 | Zentis | 210/402 |
| 3,755,995 | 9/1973 | Stickel | 55/DIG. 31 |

Primary Examiner—Theodore A. Granger
Attorney, Agent, or Firm—James E. Nilles

[57] ABSTRACT

Rectangular sieving frame consisting of a mounting constituted by a beam profile on two opposite sides and at least two thin strips secured to the beam profiles, further consisting of sieving gauze provided with warp threads lying stretched but tensionless between the two beam profiles.

4 Claims, 7 Drawing Figures

RECTANGULAR SIEVING FRAME AND FILTER DRUM PROVIDED WITH A PLURALITY OF SUCH SIEVING FRAMES

BACKGROUND OF THE INVENTION

My invention relates to a rectangular sieving frame for a belt filter or a filter drum, consisting of a mounting with sieving gauze. Experience shows that such a sieving frame, various versions of which are known, often tends to break down at particular locations owing to the fluctuating load produced. The fluctuating load is a consequence on the one hand of the periodical submergence of the sieving frame and subsequent emergence from the water, and on the other hand of the periodical cleaning involving a complete reversal of the load in the sieving gauze.

The fact that the known sieving frames tend to show untimely local ruptures is imputable to the four-sided mounting of the sieving frame which is mostly used. This conventional construction gives inevitably rise to concentrations of tension along the legs of the sieving frame and also near the corners.

SUMMARY OF THE INVENTION

According to one aspect, my invention provides a sieving frame which can better withstand the regularly produced fluctuations of the load and which consequently will have a longer life time. It is a further object of my invention to simplify the construction of the sieving frame. These objects are achieved according to my invention, by the arrangement that the mounting of the sieving frame is constituted by a beam profile on two opposite sides and by some strips perpendicular to said profiles situated in spaced relationship from and parallel to the sieving gauze, which by their ends are secured to the beam profiles, while the sieving gauze is provided with stretched but tensionless warp threads between the two beam profiles.

Due to these features the sieving gauze is suspended like a "hammock" in a reclining chair, so that an identical load is applied to all warp threads of the gauze. The weft threads take hardly any load. Apart therefrom almost exclusively a tesnile load is applied to the warp threads.

Preferably at least a strip is provided on the two free sides of the sieving gauze, the side strips protruding beyond the edge of the sieving gauze. As a consequence the outer size of the sieving frame is determined by these side strips, while the width tolerance of the sieving gauze does not cause any trouble, this tolerance is, as has been found in practice, at least equal to the mesh width. When a load is applied, minor changes in the width may occur, which due to the presence of the side strips cannot give rise to leaks.

My invention further relates to a filter drum consisting of some annular supporting and sealing rims, secured to a hub rotatable around a horizontal center line, the filter being provided with sieving frames as described hereinbefore. According to my invention each beam profile of each sieving frame is elastically clamped along an imaginary generatrice of the cylinder wall of the drum such that the strips are convexly outwardly curved at a slight pretension.

This curved shape is ideal for absorbing forces. Because of the correct selection of the curvature as a function of the maximally applied load (which is connected with the difference of pressure on the inner and outer side of the drum) the maximally permissible tension of the sieving gauze is not exceeded. The height of the annular sealing rims may also be limited, that is to say: these rims need not have an additional height to neutralize the elongation, if any, of the sieving gauze.

It should be noted that the strips also serve to support the sieving gauze during washing, when the load applied to this gauze is exactly opposite to the normal operation load. It should further be noted that in the filter drum the sieving gauze of each frame is flexible in the longitudinal direction, so that load pressures which are unevenly distributed on the surface, can be absorbed without concentrations of tension. Such load variations are produced when each sieving frame is submerged and subsequently emerges from the water. Especially when a sieving frame which has become fouled and which in a submerged condition was entirely uniformly loaded, emerges from the water the gauze will be subjected to a load which gradually decreases to naught. The same variations of tension will be produced on washing the sieve.

In this connection it is also of importance that the beam profiles of each sieving frame are elastically clamped so that these beams can adjust themselves as a function of the load. A too strong securing may cause a local increase of tension in the sieving gauze in the proximity of the beam profiles and as a consequence an early rupture. All this is avoided in a filter drum provided with the sieving frames described hereinbefore.

It should be noted that the sieving frames according to my invention can also be applied to a so-called belt filter consisting of an endless articulated belt, guided by one or more pulleys.

My invention further relates to a method for preparing a sieving frame as described hereinbefore. This method is distinguished in that after the beam profiles have been secured to the sieving gauze, a tensile load is applied to the whole, which is below the yield point but greater than the load which the sieving gauze takes in operation, and in that only then the thin strips are secured to the beam profiles. Owing to this stretching of the sieving gauze, a minor increase of length will be produced because the faint zig-zag shape of the warp threads changes into an almost stretched shape. As a consequence the length of the sieving gauze will no longer increase in operation, so that the free sides of the sieving gauze remain in the proximity of the side strips and no leakage path will form at that location.

DESCRIPTION OF A PREFERRED EMBODIMENT

Figure 1:
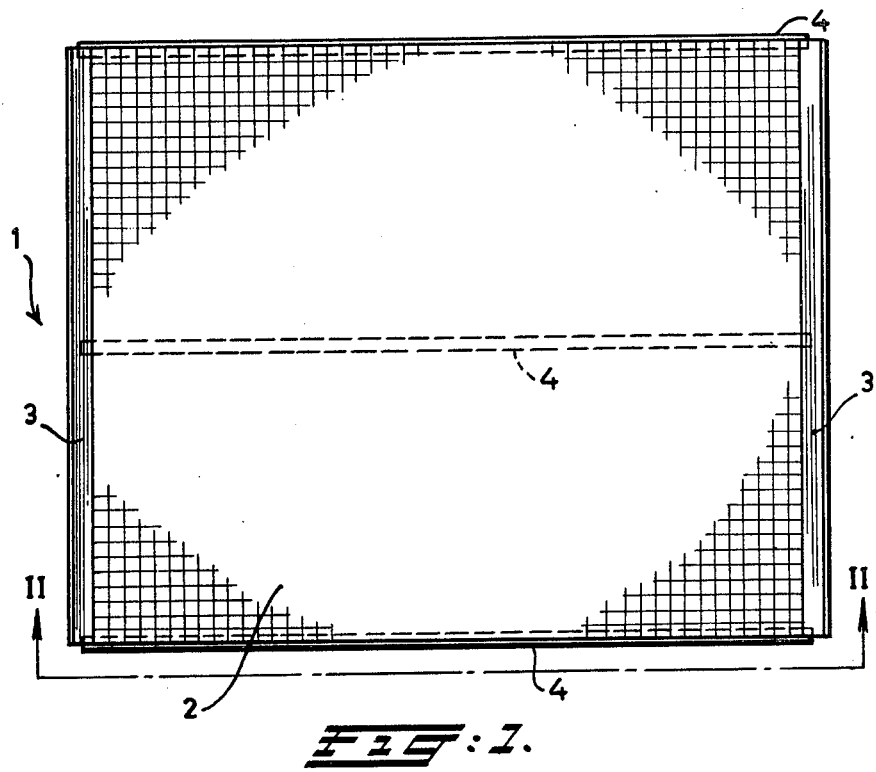
FIG. 1 is a plan view of a sieving frame.
Figure 2:
FIG. 2 is a side elevation according to the line II—II in FIG. 1.
Figure 3:
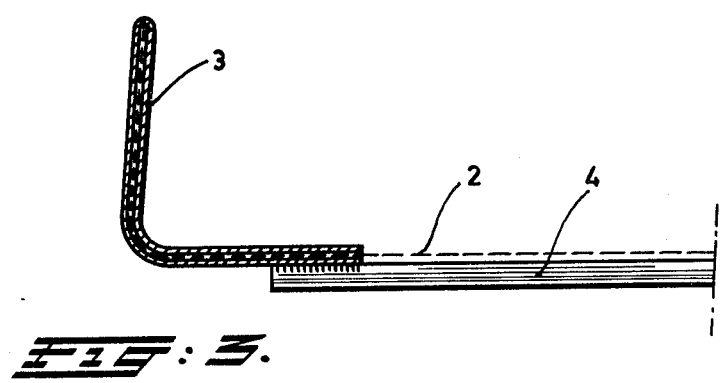
FIG. 3 shows a detail denoted by III in FIG. 2.

The sieving frame depicted in FIGS. 1 and 2 consists of a mounting 1 with sieving gauze 2. The mounting 1 consists of a beam profile 3 on two opposite sides and of some thin strips 4 perpendicular to said profiles, situated at a short distance from and parallel to the sieving gauze 2. As is best seen in FIG. 3, each beam profile consists of a doubled metal band, while the edge of the sieving gauze 2 is secured by spotwelding between the band parts which are plied on each other. This doubled metal band is folded so that in cross-section a substantially L-profile is obtained. The thin strips 4 are by their ends secured to the beam profile. The sieving gauze 2 is provided with stretched, but tensionless warp threads extending between the beam profiles 3. In the depicted emdobiment three strips 4 are disposed i.e. two along the free sides of the sieving gauze 2 and a central one. The two side strips protrude beyond the edge of the sieving gauze 2 and determine in this way exactly the outside size of the sieving frame.

In manufacturing the just described sieving frame, the sieving gauze 2 is subjected to a tensile force. This force is below the yield point, so that no permanent elongation of the warp threads is produced. As a consequence the initial zig-zag shape of the warp threads will change into an entirely stretched shape with a slight increase of the length of the sieving gauze 2 which hereby obtains its definite length. Hereupon the thin strips 4 are secured to the beam profiles 3. Due to this method, irregularities in the sieving gauze are eliminated, so that no local stress differences arise in the sieving gauze. With respect to the pull to which the sieving gauze, prior to the provision of the strips 4, is exposed, it may be indicated by way of example that the yield point of the stainless steel material is about 21 kg/mm$^2$, while the maximally produced load in operation does not exceed 11 kg/mm$^2$. The tensile force in the process of manufacturing the sieving frame may then have an intermediate value of e.g. 17 kg/mm$^2$.

Figure 6:
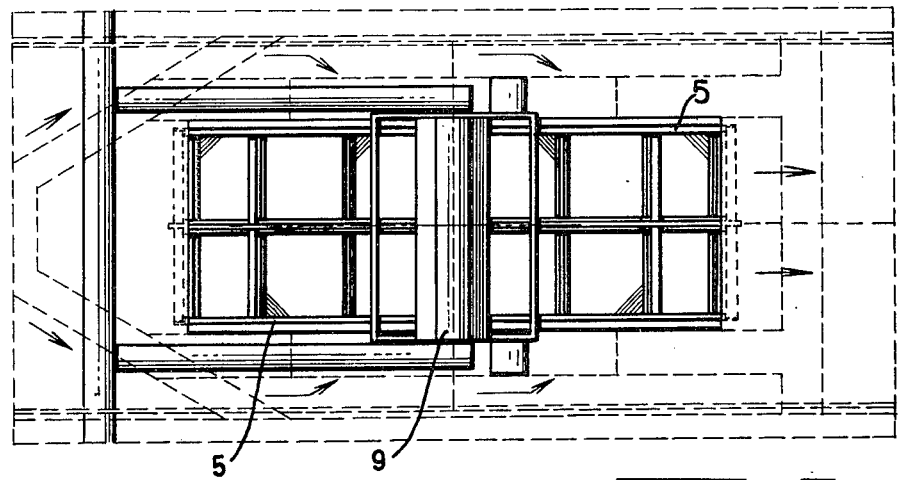
FIG. 6 is a plan view of the filter drum.
Figure 4:
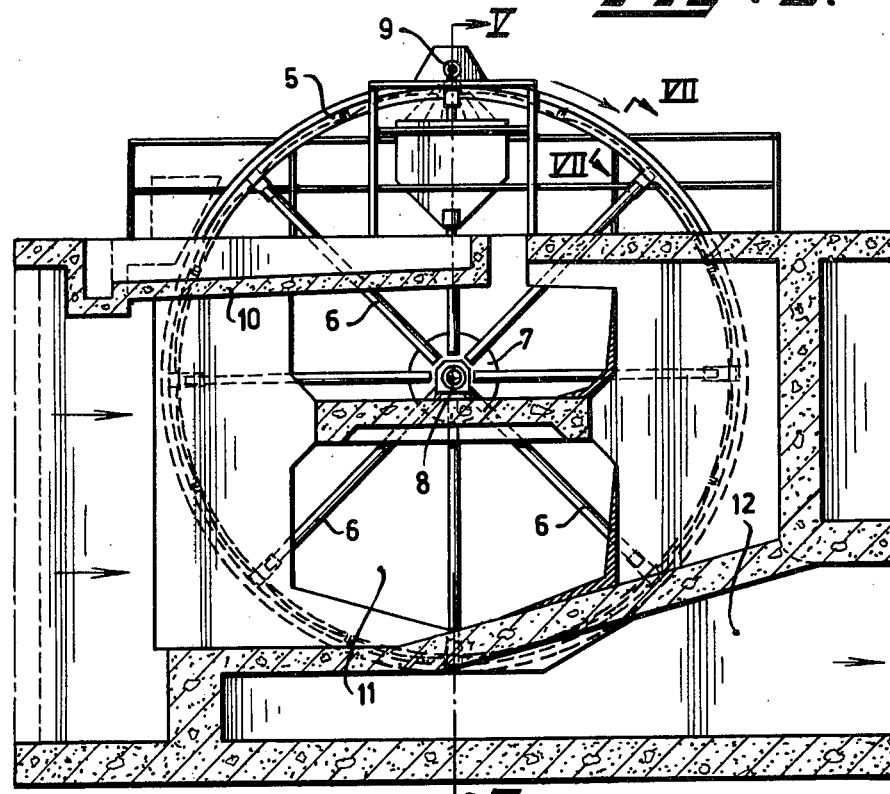
FIG. 4 is a section through a filter drum taken or line IV—IV in FIG. 5.
Figure 5:
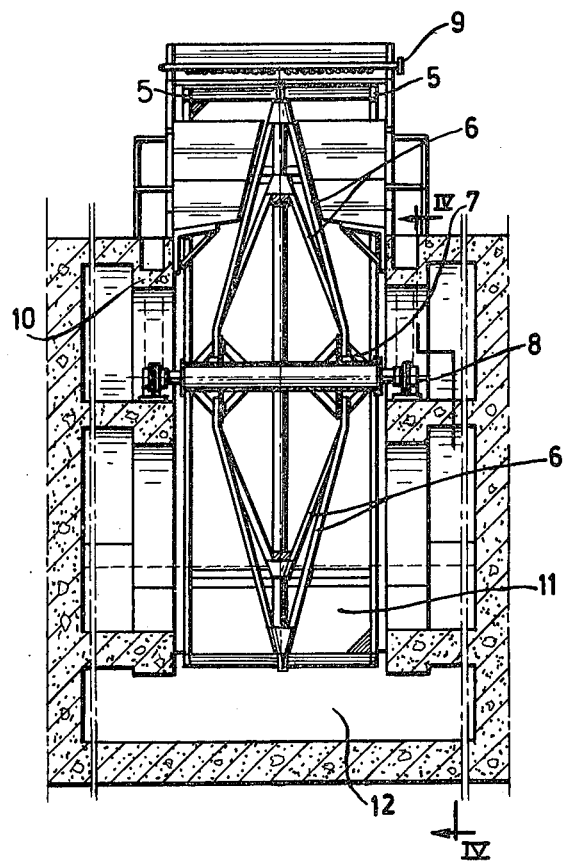
FIG. 5 is a section on the line V—V in FIG. 4.
Figure 7:
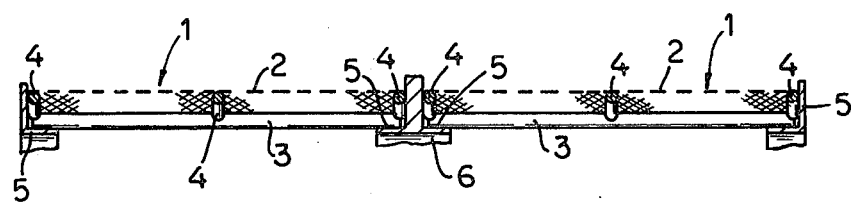
FIG. 7 is a sectional view taken on line VII—VII in FIG. 4.

The sieving drum according to FIG. 4–6 consists of some annular supporting and sealing rims 5 having a generally L-shaped cross section as seen in FIG. 6. The outer ones of the sealing rims 5 are formed by an angle iron bent into a circular form and the central rims 5 are formed by a generally T-shaped member to form two central sealing rims. The rims 5 via some A-shaped spokes 6 are secured to a hub 7, rotatable around a horizontal center line 8. Near the top a washing device 9 is arranged with a discharge gutter 10. The water to be purified is on the left side of the drum in FIG. 4 and is admitted in the usual way to the interior of the drum on either side thereof via an opening 11. The outlet 12 for the purified liquid is on the underside.

Sieving frames as described hereinbefore are mounted along the circumference of the sieving drum, the arrangement being such that the beam profiles 3 of each sieving frame are elastically clamped along an imaginary generatrix of the cylindrical surface of the drum. The strips 4 are convexly outwardly curved at a slight pre-tension, so that the sieving gauze 2 also takes the same shape. The sieving gauze is in an almost tensionless condition and can in this way efficiently absorb the load of the hydrostatic difference in pressure between the inlet 11 and the outlet 12 (which maximally amounts to about 1 m water column). The fluctuating load, owing to the fact that the sieving frames emerge again from the water and owing to the washing of the sieving frames, can be absorbed in such a way by the elastical fixation of each sieving frame that no local tension concentrations are produced in the sieving gauze. The life time of the sieving frames is therefore longer than so far was possible in this field. In order to attain this object both the method of manufacture and the construction of each sieving frame plays a part and also the mounting of each sieving frame in the sieving drum.

What I claim is:

1. A rotatable filter drum comprising a hub, annular supporting and sealing rims secured to said hub and rotatable around a horizontal center line, rectangular sieving frames for said filter drum, consisting of a mounting with sieving gauze, said mounting being constituted by a beam profile on two opposite sides and by some strips perpendicular to said profiles which by their ends are secured to the beam profiles, while the sieving gauze is provided with stretched but tensionless warp threads each having their opposite ends connected to the two beam profiles and weft threads extending parallel to said profiles and free of said mounting, each beam profile of said sieving frames being elastically clamped in such a way along an imaginary generatrice of the cylindrical surface of the drum, that the strips are convexly outwards curved at a slight pretension to form arcs of smaller radius than said drum.

2. Sieving frame according to claim 1, in which at least a strip is provided on the two free sides of the sieving gauze, these side strips protruding beyond the edge of the sieving gauze.

3. Sieving frame according to claim 1 in which each beam profile consists of a doubled metal band, while the edge of the sieving gauze is secured by spotwelding between the parts of the band which are plied on each other, the band being folded in such a manner that it has a substantially L-shaped cross section.

4. Filter drum according to claim 1 in which the connection between the annular supporting and sealing rims and the rotatable hub consists of radially extending A-shaped spokes having their radially outer apex ends secured to said rims and their inner ends secured to said hub.

* * * * *